United States Patent
Libin

(10) Patent No.: US 12,088,646 B1
(45) Date of Patent: Sep. 10, 2024

(54) USER GROUPING VIA IMMERSIVE ADD-ON APPLICATIONS FOR EXTENDED VIDEO CONFERENCING EXPERIENCES AND FEEDBACK

(71) Applicant: mmhmm inc., Little Rock, AR (US)

(72) Inventor: Phil Libin, Bentonville, AR (US)

(73) Assignee: mmhmm inc., Little Rock, AR (US)

( * ) Notice: Subject to any disclaimer, the term of this patent is extended or adjusted under 35 U.S.C. 154(b) by 217 days.

(21) Appl. No.: 17/825,955

(22) Filed: May 26, 2022

Related U.S. Application Data

(60) Provisional application No. 63/196,860, filed on Jun. 4, 2021.

(51) Int. Cl.
H04L 65/401 (2022.01)

(52) U.S. Cl.
CPC .................. H04L 65/4015 (2013.01)

(58) Field of Classification Search
CPC .................................................. H04L 65/4015
See application file for complete search history.

(56) References Cited

U.S. PATENT DOCUMENTS

| | | | | |
|---|---|---|---|---|
| 2008/0298386 A1* | 12/2008 | Fiatal | ................. | G06F 3/04886 370/449 |
| 2010/0060716 A1* | 3/2010 | Kert | ................... | H04N 21/4788 370/352 |
| 2010/0066807 A1* | 3/2010 | Eisenberg | ............. | H04M 3/567 348/E7.083 |
| 2013/0217350 A1* | 8/2013 | Singh | ................... | G06Q 10/109 702/19 |
| 2014/0282608 A1* | 9/2014 | Biancalana | ............. | G06F 9/544 719/312 |
| 2022/0085984 A1* | 3/2022 | Khandani | ............. | H04L 9/0822 |

* cited by examiner

*Primary Examiner* — Bryan Y Lee
(74) *Attorney, Agent, or Firm* — Muirhead and Saturnelli, LLC

(57) ABSTRACT

Enhancing a video conference that is provided by video conference software includes a subset of participants of the video conference using a particular add-on application that is compatible with the video conference software, the add-on application obtaining communication parameters from the video conference software, discovering the subset of the participants, and the add-on application using the communication parameters from the video conference software to provide at least some of the subset of the participants with private communication that is independent of communication capabilities provided by the video conference software and to provide at least one visual indication to each of the subset of participants. The add-on application may provide specific data to the video conference software. The video conference software may provide the specific data to particular participants of the video conference independently of whether any of the particular participants have the add-on application.

13 Claims, 7 Drawing Sheets

USER GROUPING VIA IMMERSIVE ADD-ON APPLICATIONS FOR EXTENDED VIDEO CONFERENCING EXPERIENCES AND FEEDBACK

CROSS-REFERENCE TO RELATED APPLICATIONS

This application claims priority to U.S. Prov. App. No. 63/196,860, filed on Jun. 4, 2021, and entitled "USER GROUPING VIA IMMERSIVE ADD-ON APPLICATIONS FOR EXTENDED VIDEO CONFERENCING EXPERIENCES AND FEEDBACK", which is incorporated herein by reference.

TECHNICAL FIELD

This application is directed to the fields of visual communications and user interfaces, and more particularly to the field of video conferencing with extra user grouping made possible by the presence of installed add-on immersive applications.

BACKGROUND OF THE INVENTION

Video conferencing is quickly gaining the position of one of the top productivity and communications media. With the rise of a remote, geographically dispersed workforce, fully online distributed companies, hybrid work metaphor combining synchronous and asynchronous communications, and the necessity to overcome challenges and limitations caused by the COVID-19 pandemic, the ability to connect people through their work, personal and family lives, education, entertainment, and other areas has become a key advantage of video conferencing solutions. According to the most recent market studies, the global video conferencing market is estimated to reach $22.5 billion by 2026. Over 75% of corporate businesses are already using video conferencing to facilitate team collaboration, while for 58% of companies it has become part of their daily operations.

On an average day, US businesses have over 11 million video conferencing meetings with hundreds of millions of daily participants: Zoom alone has over 300 million daily participants of its video meetings, Google Hangout Meets over 100 million daily participants, while Microsoft Teams had almost 75 million active daily users in 2020. Not only the overall volume but also an average size of webinars and video conferences is constantly increasing, thanks to multiple factors, such as the overall growth in popularity of the video communications, and the above-mentioned expansion of the distributed workforce residing in multiple locations and abandoning centralized physical meeting places, such as company headquarters. These factors are especially organic for the one billion strong category of knowledge workers.

Not surprisingly, the number of concurrent participants of a video conference offered by leading platforms, such as Zoom, Cisco Webex, BlueJeans and other solutions, has quickly increased to many hundreds and even thousands of people. Thus, Cisco Webex allows 100 participants for its free offer and 1000 participants for standard Webex Meetings. Zoom's offerings are more granular with up to 100 participants in any regular free or paid accounts (with a limited meeting time for free accounts) and a separate option of Large Meetings with 200, 300 and 500 participants. As for the Webinar variant, where all participants may watch but most cannot see each other or communicate, Webex and Zoom offer different limit of 3000 and 10000 total participants. In addition to increasing the audience size per meeting, many video conferencing vendors allow breakout sessions for portions of the audience and even splitting the whole audience into a number of breakout sessions (breakout rooms), up to 75 in Blue Jeans solution and 50 in Zoom.

Other important trends in video conferencing include audience feedback on the success of video conferencing, supported by an expanding set of features such as non-verbal reactions and embedded polls, and the emergence of video conferencing platforms (Zoom, in the first place) and important add-on platform applications, such as mmhmm with its immersive features and new presentation metaphor.

SUMMARY OF THE INVENTION

Notwithstanding the overall progress in video conferencing, its user feedback system, as well as sharing and immersive features are still suffering from multiple shortcomings. Breakout sessions are excessively centralized and cannot be held ad hoc by the initiative of non-hosting conference participants, even if such participants have powerful sharing platform-compatible add-ons installed on their devices. Recording options in breakout sessions are limited. Also, non-panelist webinar audience members usually don't have an opportunity to participate in the conference, and so the feedback of the audience members is limited to a couple of secondary features, and the audience members cannot communicate with each other.

Accordingly, it is important to develop techniques and systems for improving video conferencing experiences by employing immersive and communications add-ons to a video conferencing platform.

According to the system described herein, enhancing a video conference that is provided by video conference software includes a subset of participants of the video conference using a particular add-on application that is compatible with the video conference software, the add-on application obtaining communication parameters from the video conference software, discovering the subset of the participants, and the add-on application using the communication parameters from the video conference software to provide at least some of the subset of the participants with private communication that is independent of communication capabilities provided by the video conference software and to provide at least one visual indication to each of the subset of participants. The add-on application may provide specific data to the video conference software. The video conference software may provide the specific data to particular participants of the video conference independently of whether any of the particular participants have the add-on application. At least one visual indication may provided to each of the subset of participants indicating membership in a group corresponding to the subset of participants. The private communication may use a private view pane and a chat pane for at least some of the subset of participants. Each of the private view pane and the chat pane may be an overlay on top of a main video conferencing grid and/or may be provided in a separate pop-up window. The at least some of the subset of the participants may initiate an ad hoc breakout session separate from the video conference. The private communication may include the at least some of the subset of the participants exchanging text, audio, and/or video. The private communication may includes one-on-one video chatting, shared writing pads, shared whiteboards, gesture recognition, exaggerated gestures, and/or non-verbal communication features that provide feedback. One of the subset of participants of the video conference may be a separate presenter that is different from a presenter of the video conference and may be provided to the at least some of the subset of the participants using the private view pane and the chat pane. The at least some of the subset of the participants may be provided with a recording feature that is separate from any recording feature of the video conference software. The at least some of the subset of the participants may be provided with additional feedback features that are available only to the subset of the participants. The additional feedback features may include voting for a certain aspect of a video conference, addressing a request by a host and/or addressing a request by one or more of the subset of the participants. The additional feedback features may include using exaggerated gestures and emoticons. The additional feedback features may include simultaneously displaying a stats panel that provides feedback information. The feedback information may be displayed to all of the participants of the video conference. At least one of the participants of the subset of the participants may provide a setting to prevent interruption or discovery from other ones of the participants. At least one of the subset of the participants may have at least one other additional add-on application.

According further to the system described herein, a non-transitory computer readable medium contains software that enhances a video conference that is provided by video conference software. A subset of participants of the video conference use a particular add-on application that is compatible with the video conference software. Software for the add-on application includes executable code that obtains communication parameters from the video conference software and executable code that uses the communication parameters from the video conference software to provide at least some of the subset of the participants with private communication that is independent of communication capabilities provided by the video conference software and to provide at least one visual indication to each of the subset of participants. The add-on application may provide specific data to the video conference software. The video conference software may provide the specific data to particular participants of the video conference independently of whether any of the particular participants have the add-on application. At least one visual indication may provided to each of the subset of participants indicating membership in a group corresponding to the subset of participants. The private communication may use a private view pane and a chat pane for at least some of the subset of participants. Each of the private view pane and the chat pane may be an overlay on top of a main video conferencing grid and/or may be provided in a separate pop-up window. The at least some of the subset of the participants may initiate an ad hoc breakout session separate from the video conference. The private communication may include the at least some of the subset of the participants exchanging text, audio, and/or video. The private communication may includes one-on-one video chatting, shared writing pads, shared whiteboards, gesture recognition, exaggerated gestures, and/or non-verbal communication features that provide feedback. One of the subset of participants of the video conference may be a separate presenter that is different from a presenter of the video conference and may be provided to the at least some of the subset of the participants using the private view pane and the chat pane. The at least some of the subset of the participants may be provided with a recording feature that is separate from any recording feature of the video conference software. The at least some of the subset of the participants may be provided with additional feedback features that are available only to the subset of the participants. The additional feedback features may include voting for a certain aspect of a video conference, addressing a request by a host and/or addressing a request by one or more of the subset of the participants. The additional feedback features may include using exaggerated gestures and emoticons. The additional feedback features may include simultaneously displaying a stats panel that provides feedback information. The feedback information may be displayed to all of the participants of the video conference. At least one of the participants of the subset of the participants may provide a setting to prevent interruption or discovery from other ones of the participants. At least one of the subset of the participants may have at least one other additional add-on application.

The proposed system offers additional groupings (murmuration) of participants of a video conference through connections provided by immersive, communications capable applications installed on participant devices as add-ons, compatible with the video conferencing platform used by the participants. An initial discovery establishes additional connections between participants, which may be utilized for various purposes, supplementing the capabilities of the main video conference and including ad hoc breakout sessions with or without departing from the main conference, bringing all members of a murmuration into a panel view, immersive presentations by multiple participants, interactive and other advanced forms of recording of fragments of a video conference, and visual polling through exaggerated gestures as a proxy for the general sentiment of video conference participants. Additional groupings may be available to any portion of the audience of a video conference or a webinar, including webinar participants who may not communicate privately and/or visually via the regular platform features of a video conferencing platform.

Various aspects of system functioning are explained as follows:

1. Add-on applications. Some of the existing video conferencing systems, Zoom for example, are positioned as video conferencing platforms. Accordingly, a growing ecosystem of platform compatible add-on applications becomes available to conference participants, including immersive applications with their own communication means, such as mmhmm, Loom, and other platform software. Some of the compatible add-on applications may connect participants of a video conference using different media, such as text, audio, and video, and may provide other advanced experiences, including immersive features, both outside and within the main video conferencing stream, without requiring the participants to depart from an on-going video conference on the chosen platform.

2. Discovery. The proposed system discovers platform add-ons that are installed and may be currently activated on desktop and mobile computers of the conference participants, and therefore, instantly available to the participants. The discovery process may be activated automatically, directed by a conference organizer or a host, or may be initiated ad hoc by conference participants at any time.

3. Murmuration. A subset of participants of a video conference with a particular discovered add-on platform application forms a murmuration (cluster, group) of participants who may possess certain advanced conferencing capabilities, such as shared writing pads or whiteboards, gesture recognition, exaggerated gestures, and other non-verbal communication features for quick feedback, etc. Each conference participant may have multiple add-ons installed and, optionally, activated; therefore, conference participants may belong to multiple murmuration groups. Subject to privacy considerations, each participant may promote or hide the discovery for any of the installed add-ons and may choose different levels of participation in a murmuration (for example, decline visual or audio appearance). Participants may change their discovery options and configuration at any time, with obvious two-way consequences for the participant visibility within each murmuration.

4. Connectivity graph. Participants of a video conference may be partially or fully linked by various types of connections that may be directed or undirected and may differ by participant categories. For example, panelists of a webinar may be fully connected with each other, including an ability to watch any panelist in a video grid, listen to audio of the panelists and have common and private chat (text) channels. In contrast, viewers of the same webinar may not have visual or audio connection with each other or an audio connection to the panelists. The set of nodes, each representing a conference participant, and the set of edges of different types, connecting the participants, as explained above, form a connectivity graph of a video conference (typologically, a multigraph). Once the add-on applications for a video conference are discovered, and the murmuration for each add-on application is established, additional connections between the members of each murmuration enrich the connectivity graph and enhance communication opportunities within each murmuration.

5. Private view and advanced communication features for a murmuration. A murmuration of participants may be able to form a private view and establish different types of additional communications between the members of the murmuration via the associated add-on application. This may include, for example, a separate chat panel for the murmuration use. Multiple display and functioning options for such private view panes and communication capabilities within the murmuration may be available, as explained below:
   a. A private pane may be organized based on the features of the video conferencing platform, similar to breakout sessions available in some conferencing solutions. The difference between a generic and a murmuration specific breakout session may be that:
      i. A murmuration specific panel may be called at any time as an ad hoc gathering within a murmuration, as opposed to relatively strict rules directing breakout sessions in the conventional conferencing solutions.
      ii. A murmuration specific panel may use various advanced features, such as immersive displays with teleporting of murmuration members, one-on-one video chatting, writing pads, and other features of add-on apps mentioned above.
   b. A private pane may function as an overlay on top of the main video conferencing grid or in a separate pop-up window, organized and supported by the streaming and visualization features of the add-on application, running in parallel with the main video conference.

Private views may also expand visualization and communication capabilities to a mixed audience, such as a mix of panelists and viewers of a webinar. Private views may be opened and closed at any time and may co-exist with the main video conference view (for example, as a set of minimized private views, activated by various members of a murmuration independently, on demand). The private views may be regularly updated as murmuration members arrive, leave, or change discovery and/or visibility preferences, as explained above.

6. Immersive features and co-presentations. When an add-on application possesses certain immersive capabilities and a murmuration member for the associated application takes the stage as a main presenter of a video conference, the conference as a whole may benefit from the immersive features of the add-on. For example, the presenter may invite another murmuration member (or several members) to join as one or more co-presenters and the presenter and co-presenter(s) may share the presentation space via teleporting or other similar features, such as co-pilot presentations in mmhmm. The presenter and co-presenter(s) may also open and use multiple shared presentation channels in the presentation space or may close visual presentation channels and initiate a panel talk.

7. Additional recording features. Communications and immersive experiences of murmuration members in private views may employ additional recording capabilities that may be absent or limited for regular participants of the video conference, including advanced interactive recordings (offered, for example, by the mmhmm software), editable and available for creating subsequent hybrid and immersive pre-recorded and live presentations.

8. Advanced user feedback. Members of a murmuration may employ advanced features of an associated add-on application to provide innovative forms of feedback to a video conference or its hosts and organizers. For example, murmuration members may vote for a certain aspect of a video conference, in response to a poll, addressing a request by a host, or by the initiative of one or more of the murmuration members, in a private view, visible to all murmuration members, using exaggerated gestures and emoticons, and simultaneously displaying a status pane for the murmuration. Depending on the size of a murmuration, hosts may use such instant feedback by murmuration members as a proxy for the overall audience sentiment.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

Figure 1:
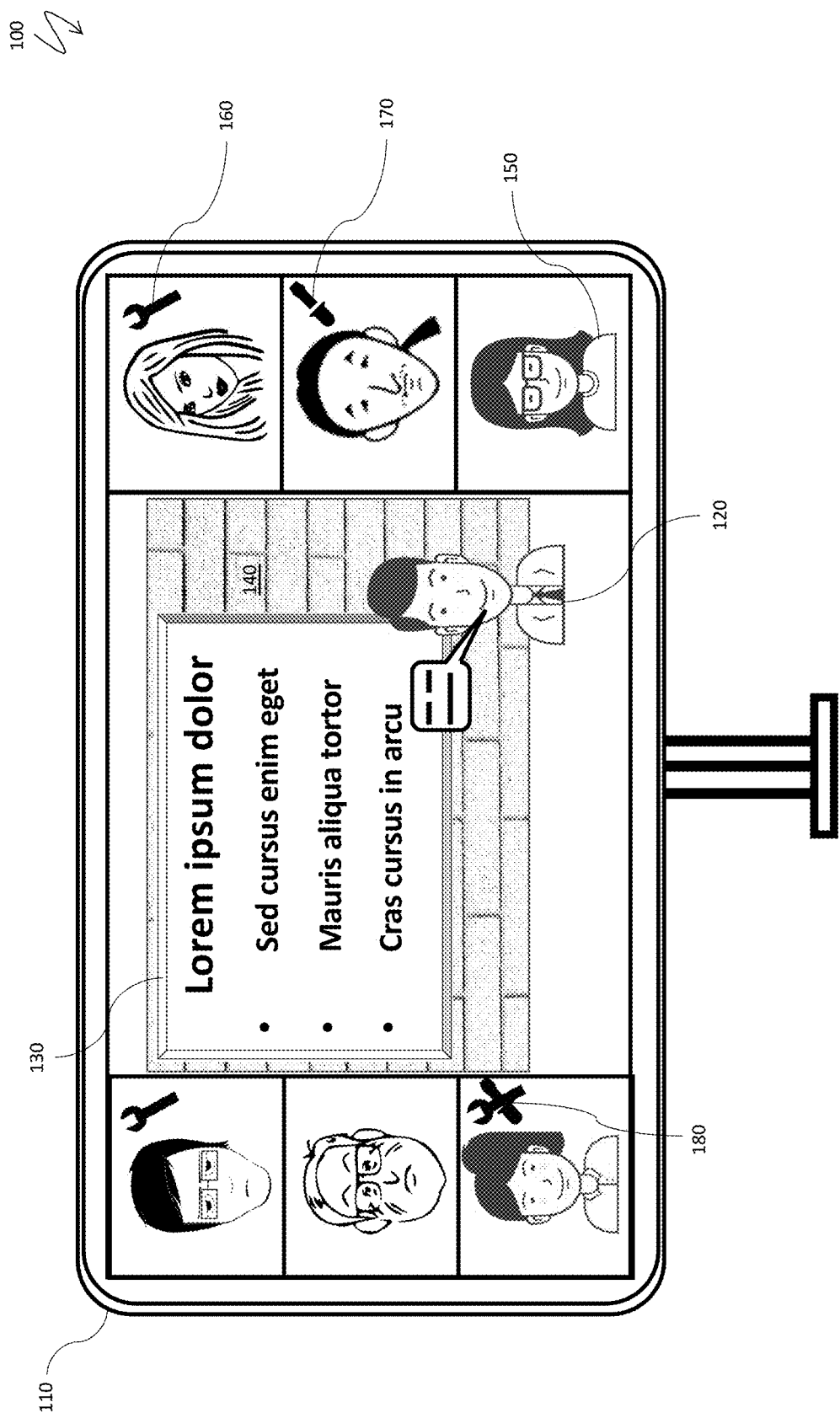
FIG. 1 is a schematic illustration of a video conference where some participants have installed add-on applications, according to an embodiment of the system described herein.

The system described herein provides a mechanism, workflow, and features for additional groupings (murmuration) of participants of a video conference through connections provided by immersive, communications capable applications installed on participant devices as add-ons; additional features may include ad hoc breakout sessions with or without departing from the main conference, immersive, interactive, and other advanced forms of recording, and visual polling through exaggerated gestures as a proxy for the general sentiment of video conference participants FIG. 1 is a schematic illustration 100 of a video conference where some participants have installed add-on applications. A video conference 110 includes a talk by a presenter 120 explaining a presentation 130 opened in a virtual channel on a background 140. In addition to a common participant 150, several other participants have installed and activated add-on applications 160, 170, 180; the add-on applications 160, 170, 180 provide extra communication capabilities and features, compatible with the video conferencing platform and service, as explained elsewhere herein. The add-on applications 160, 170, 180 may be conventionally integrated with commercially available video conferencing software, such as Zoom software. The add-on applications may automatically obtain communication parameters (e.g., data identifying Internet addresses, capabilities, transmission speed, connections, security information, etc.) from the video conferencing software, including video and audio feed data/parameters used by the video conferencing software, user information, etc. that can subsequently be employed by the add-on application for private communication and other capabilities, as described in more detail elsewhere herein (see FIG. 7 and the accompanying text for more information).

Figure 2:
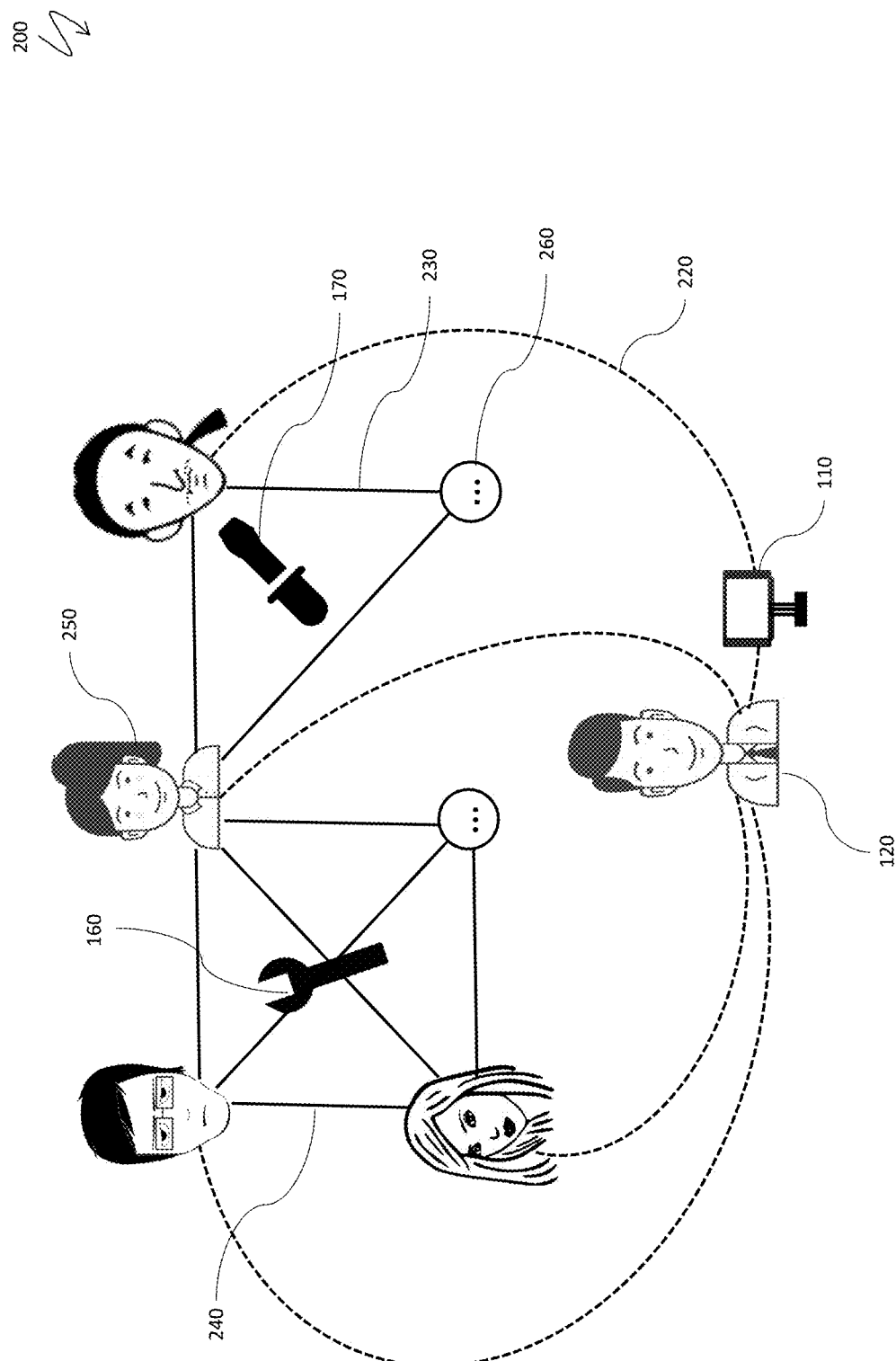
FIG. 2 is a schematic illustration of the connectivity graph for conference participants, according to an embodiment of the system described herein.

FIG. 2 is a schematic illustration 200 of a connectivity graph for the video conference participants. The video conference 110 connects the presenter 120 with all participants of the video conference 110 via a main connectivity subgraph 220. Additionally, the conference participants may establish additional connections using communication features of the installed applications 160, 170, establishing additional connectivity subgraphs 230, 240. One participant 250 is the most connected person who is technically enabled to join any of the communications shown in FIG. 2. Collapsed portions 260 of the connectivity subgraphs represent additional members of a murmuration not shown in FIG. 2. The full connectivity graph is the sum of all subgraphs (all nodes with all [multi]edges).

Figure 3:
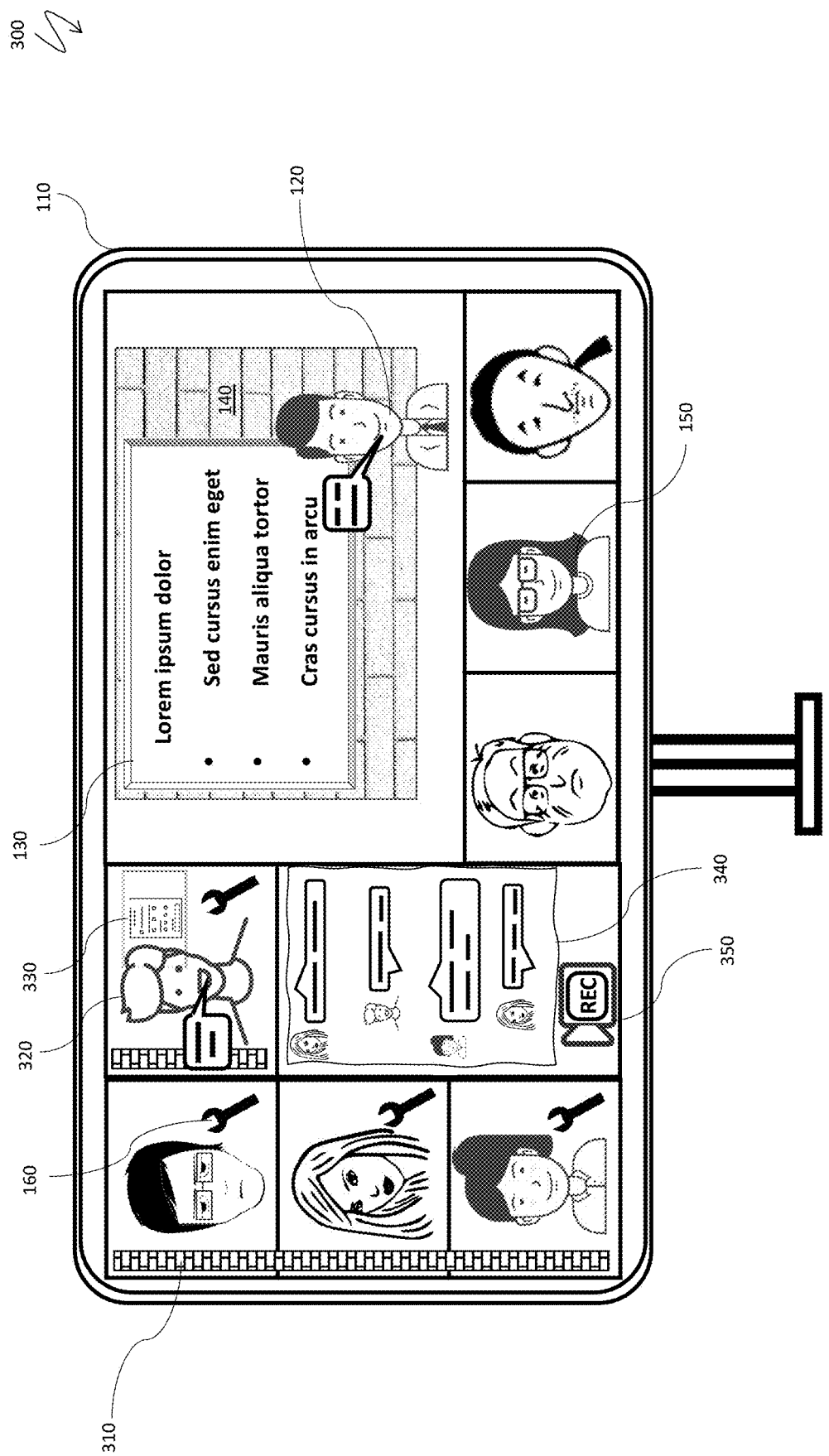
FIG. 3 is a schematic illustration of a user murmuration with a private view and chat pane, according to an embodiment of the system described herein.

FIG. 3 is a schematic illustration 300 of a user murmuration with a private view pane and chat pane. Some of the participants of the video conference 110 with the presenter 120, presentation 130 on the virtual or physical background 140 and common users 150 have installed and activated the add-on application 160 and are using communication features of the add-on application 160 to join a murmuration 310 (with or without leaving the conference 110), where the participants in the murmuration 310 have opened a private view pane with a separate presenter 320 with an additional presentation 330, a chat panel 340 and a recording feature 350. The difference from a conventional breakout session supported in some video conferencing systems is that the users are using communication capabilities of a separate application 160 rather than the original video conferencing system directing the video conference 110 even though the separate application 160 may obtain communication parameters from the original video conferencing system (see FIG. 7 for details); accordingly, the users may use advanced features of the application 160, such as a group chat that may not be available in the original setup, in parallel with participating in the main conference. Note also that, as described elsewhere herein, the add-on application 160 may obtain communication parameters from the original video conferencing system, which is more efficient, and possibly more secure, than setting up an entirely separate application for private communication. Additionally, the add-on application is capable of sending its visual, audio notifications and other types of data to all participants of the video conference, which is facilitated by the date exchange with the video conference software.

Figure 4:
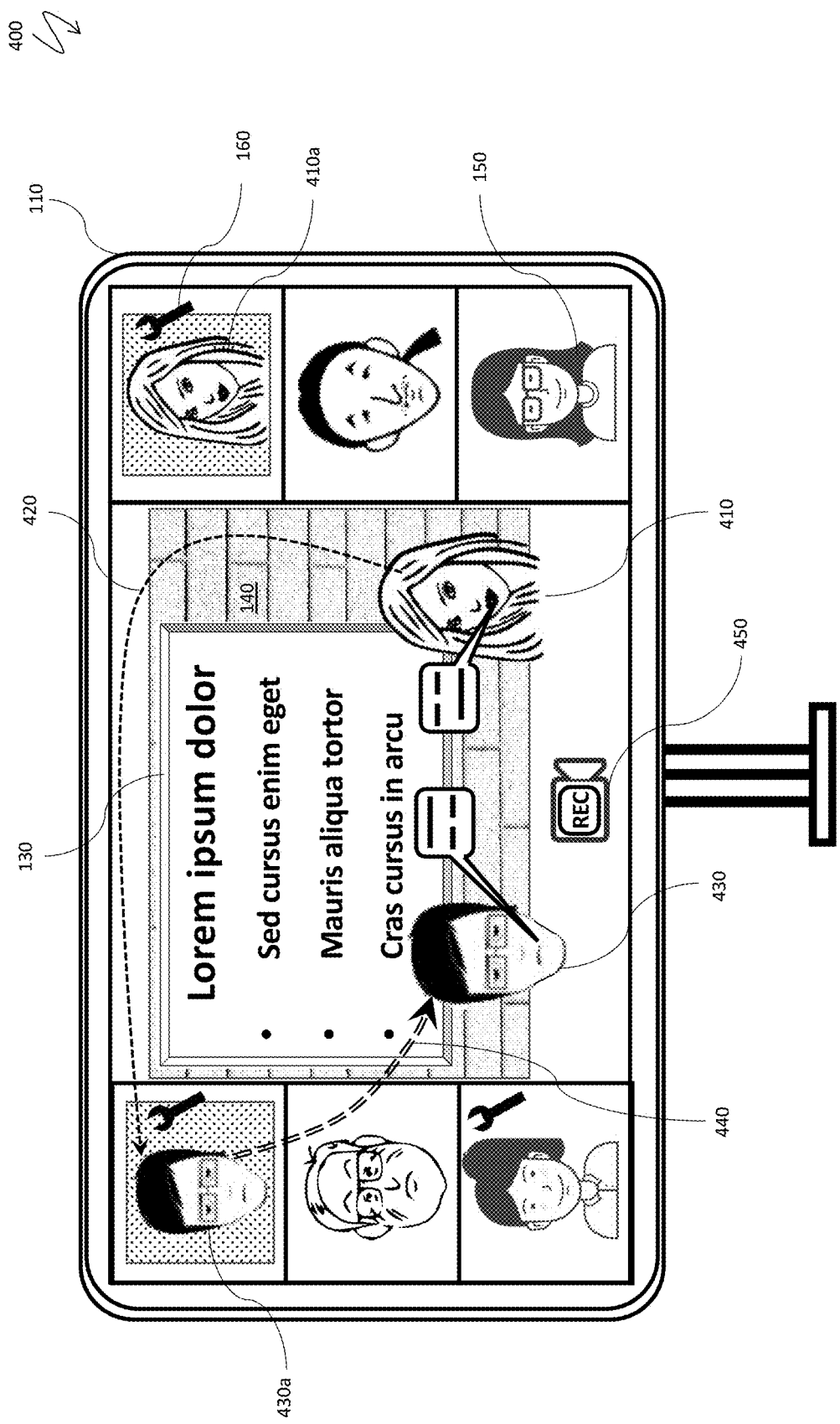
FIG. 4 is a schematic illustration of a co-presentation mode with a murmuration member as a presenter, according to an embodiment of the system described herein.

FIG. 4 is a schematic illustration 400 of a co-presentation mode with a murmuration member as a presenter. A participant 410a of the video conference 110 is a member of a murmuration associated with the add-on application 160, which possesses communication, presentation, and immersive capabilities, compatible with the original video conferencing system of the video conference 110. Eventually, the participant 410a becomes a presenter 410 in the video conference 110 with the presentation 130 shown in a virtual channel on the background 140, immersed into the presentation environment due to immersive capabilities of the application 160. For a portion or an entirety of the presentation, the new presenter 410 may invite an other member 430a, as illustrated by a dashed arrow 420. The other member 430a, who is a member of the murmuration associated with the add-on application 160, joins the presentation as a co-presenter 430 in the immersive mode, as shown by an arrow 440. The compatibility of the add-on communication and immersive application 160 with the original video conferencing system enables the regular participant 150 to join the immersive multi-presenter conference. Additionally, the conference may be recorded, as shown by a recording feature 450.

Figure 5:
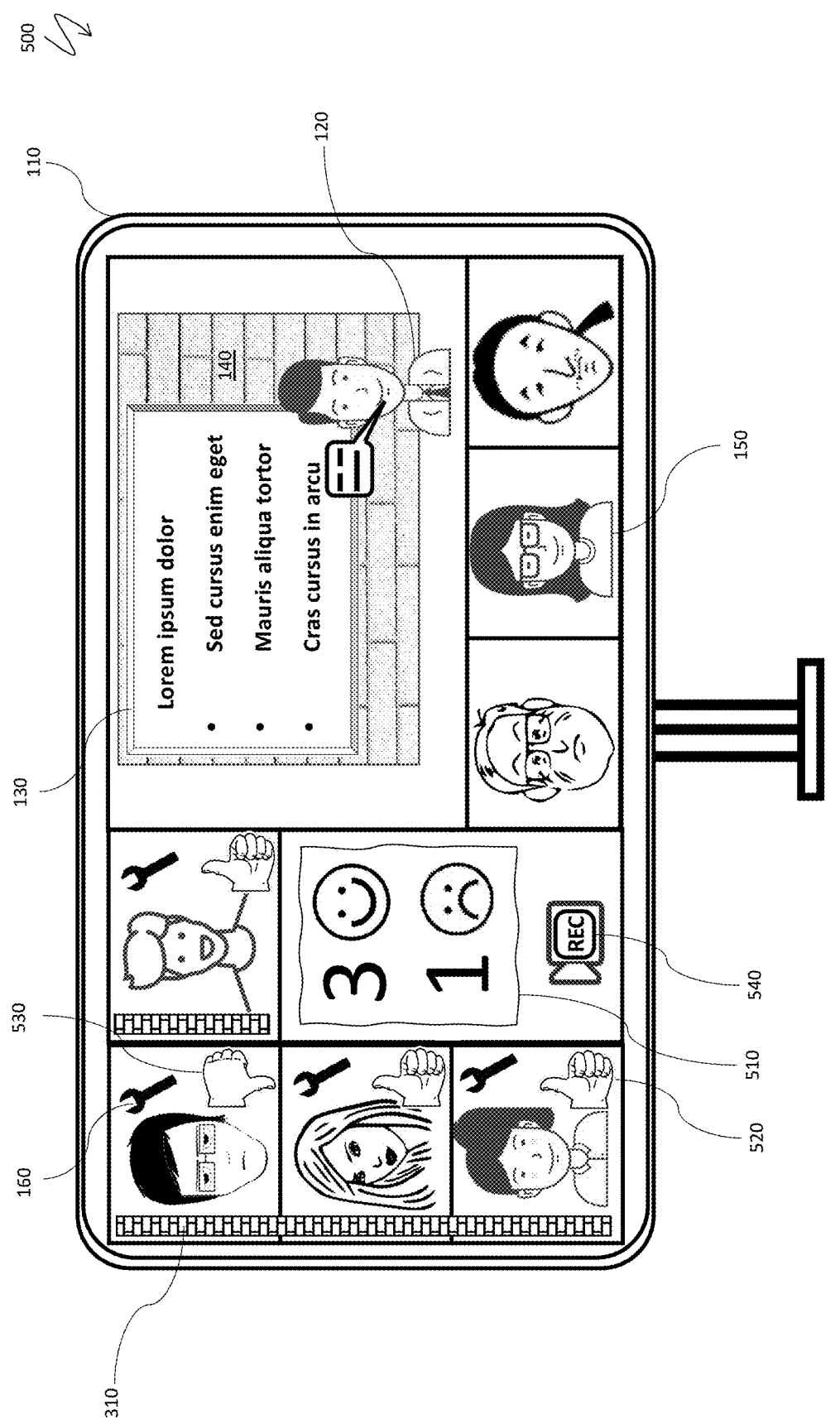
FIG. 5 is a schematic illustration of murmuration feedback as a proxy for the audience sentiment, according to an embodiment of the system described herein.

FIG. 5 is a schematic illustration 500 of murmuration feedback as a proxy for the audience sentiment. The murmuration 310 associated with the add-on communications application 160 (see FIG. 3 for more information) is used by members of the murmuration 310 to provide feedback to the presentation 130 (shown in a virtual channel opened on the background 140) made by the presenter 120 during the video conference 110 and watched by members of the murmuration 310, as well as by the ordinary participants 150. The members of the murmuration 310 have decided to provide feedback through an open voting feature and a feedback stats panel 510, supported by the application 160. The feedback may be provided as an ad hoc initiative of the members or in response to a request by the presenter 120 or the conference staff. The feedback stats panel 510 is displaying to the members of the murmuration 310 (and, optionally, to the hosts or organizers of the conference, or to the whole audience) the scores of positive and negative reactions to the presentation. An open voting process is enabled by gesture recognition and exaggerated gesture features of the application 160, as illustrated by a thumbs up gesture 520 and a thumbs down gesture 530. Note that the feedback stats panel may be displayed not only to the members of murmuration but also to all participants of the video conference through the data exchange process, explained elsewhere herein (see, for example, FIG. 7 and the accompanying text).

Figure 6:
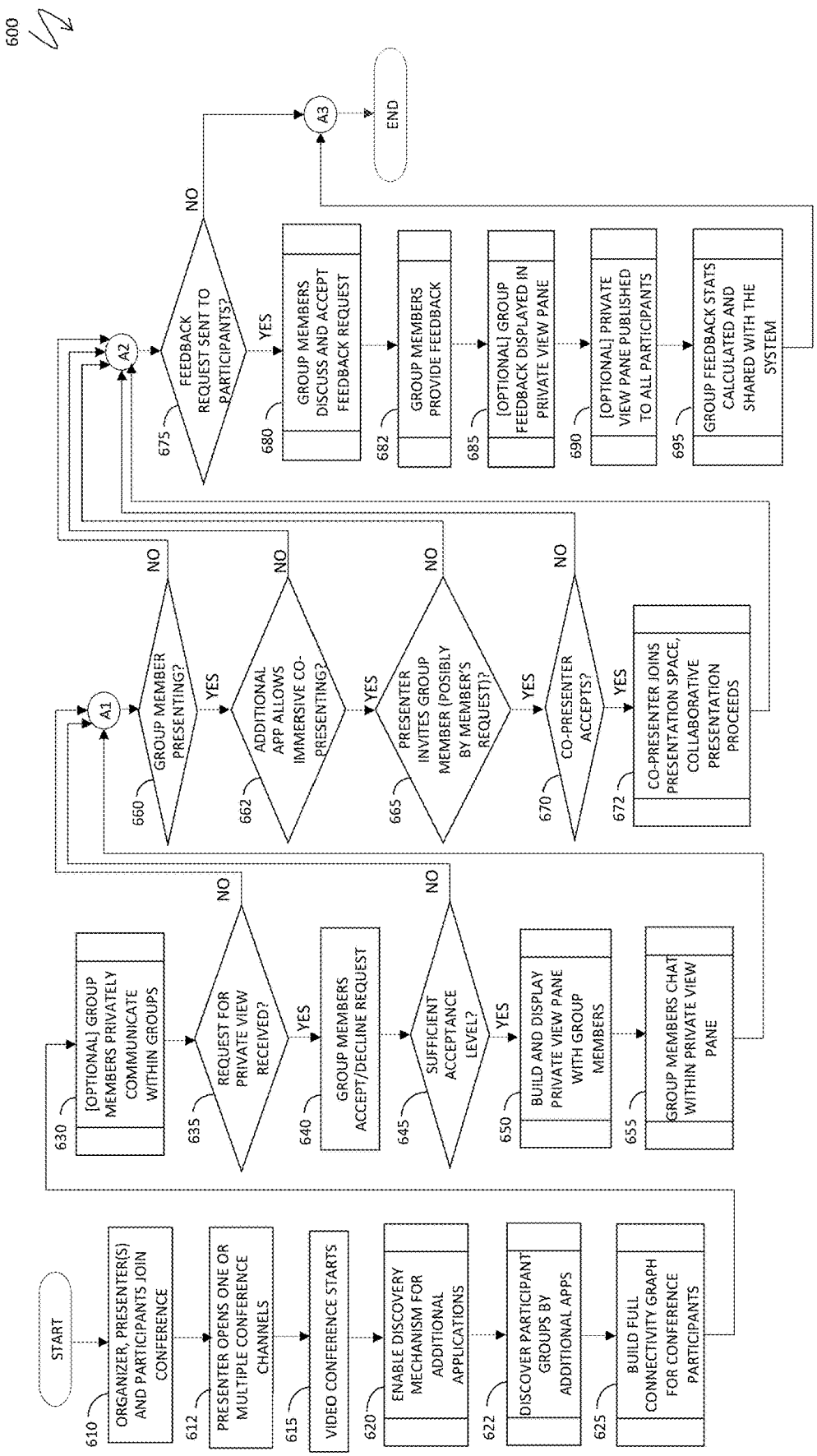
FIG. 6 is a system flow diagram illustrating system functioning in connection with a video conference with additional applications installed and used by conference participants, according to an embodiment of the system described herein.

Referring to FIG. 6, a system flow diagram 600 illustrating system functioning in connection with a video conference with additional applications installed and used by some of the conference participants. Processing begins at a step 610, where the organizer(s), presenter(s) and participants join the conference. After the step 610, processing proceeds to a step 612, where the presenter opens one or multiple conference channels (see FIG. 1 for details). After the step 612, processing proceeds to a step 615, where the video conference starts. After the step 615, processing proceeds to a step 620, where a discovery mechanism for add-on applications is enabled. After the step 620, processing proceeds to a step 622, where the system discovers participant groups by additional applications, as explained elsewhere herein (see section 3 of the Summary). After the step 622, processing proceeds to a step 625, where the system builds a full connectivity graph for conference participants. After the step 625, processing proceeds to an optional step 630, where group (murmuration) members are privately communicating within groups using communication capabilities of installed add-on applications.

After the step 630, processing proceeds to a test step 635, where it is determined whether a request for a private view has been received for a group. If so, processing proceeds to a step 640, where group members accept or decline the request. After the step 640, processing proceeds to a test step 645, where it is determined whether a sufficient acceptance level for opening a private view has been received. If so, processing proceeds to a step 650, where a private review pane with group members is built and displayed. After the step 650, processing proceeds to a step 655, where group members are chatting within a private view pane. After the step 655, processing proceeds to a test step 660, where it is determined whether a group member has become the main presenter for the video conference. Note that the step 660 may be independently reached from the test step 635 if it is determined that a request for private view is not received or from the test step 645 if it is determined that the acceptance level is insufficient. If it is determined that a group member has become the main presenter for the video conference, processing proceeds to a test step 662, where it is determined whether the additional app associated with the group to which the current presenter belongs, allows for the immersive co-presenting. If so, processing proceeds to a test step 665, where it is determined whether the current presenter invites a group member (possibly by that member's request) to join as a co-presenter. If so, processing proceeds to a test step 670, where it is determined whether the co-presenter accepts. If so, processing proceeds to a step 672, where the co-presenter joins the presentation space in the immersive mode and the collaborative presentation proceeds.

After the step 672, processing proceeds to a test step 675, where it is determined whether a feedback request is sent to the participants. Note that the test step 675 may be independently reached from four other test steps: the test step 660, if it is determined that no group member is presenting; the test step 662, if it is determined that the add-on app associated with the group does not have an immersive co-presenting feature; the test step 665, if it is determined that that the presenter does not invite a group member; and the test step 670, if it is determined that the chosen co-presenter does not accept the invitation. If it is determined at the test step 675 that the feedback request has not been sent to the participants, processing is complete; otherwise, processing proceeds to a step 680, where the group members discuss and accept the feedback request (alternatively, the group members may decide to provide the feedback on their own, as explained elsewhere herein-see FIG. 5 and the accompanying text for more information). After the step 680, processing proceeds to a step 682, where group members provide feedback (which may include emoticons, visually represented by exaggerated gestures as explained in FIG. 5). After the step 682, processing proceeds to an optional step 685, where the group feedback is displayed in a private view pane (such as a feedback stats pane explained in conjunction with FIG. 5). After the step 685, processing proceeds to an optional step 690, where the private view pane is made available for all video conference participants. After the step 690, processing proceeds to a step 695, where group feedback stats are calculated and shared with the system. After the step 695, processing is complete.

Figure 7:
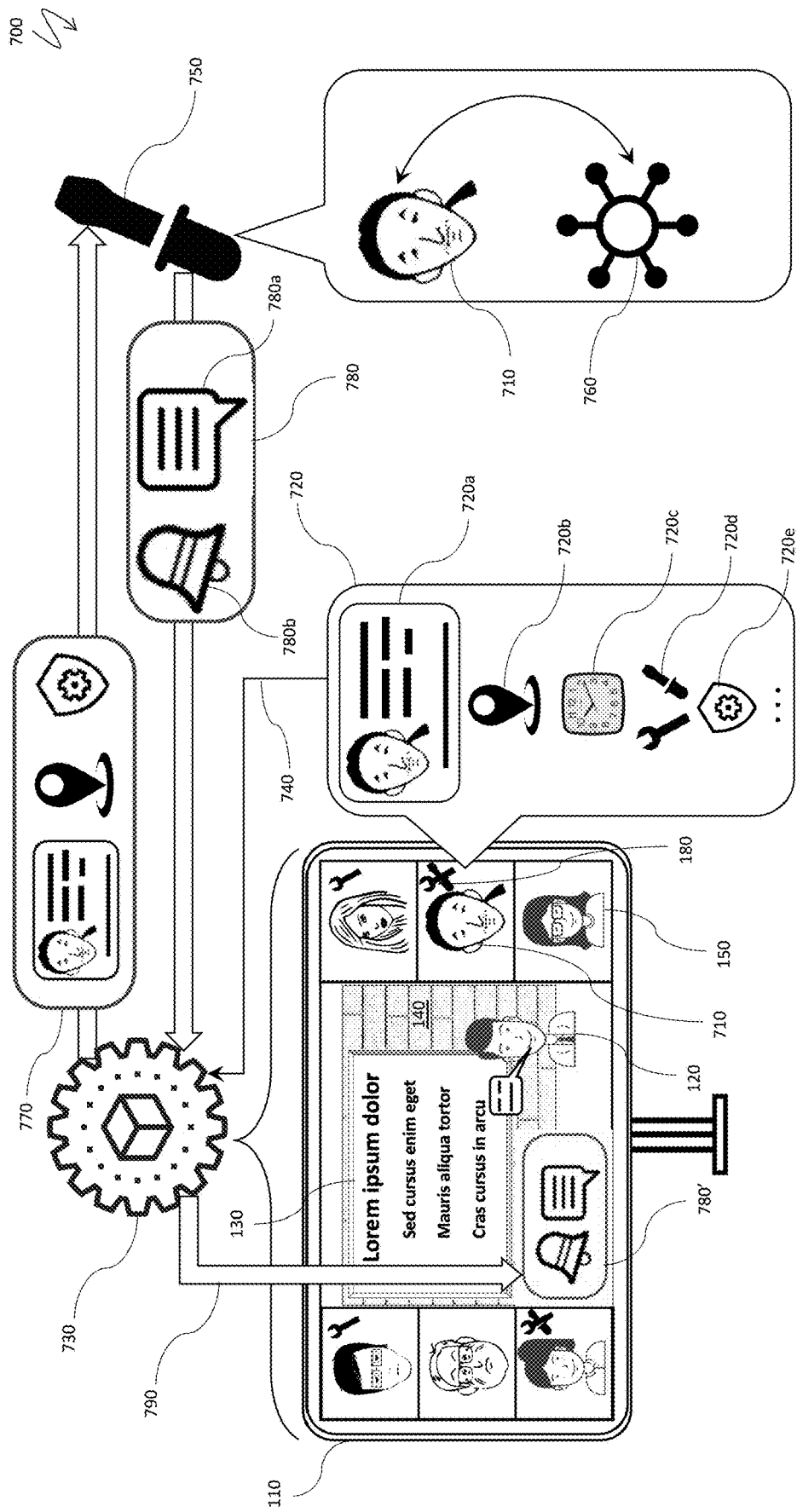
FIG. 7 is a schematic illustration of information flow between video conference software and an add-on application, according to an embodiment of the system described herein.

FIG. 7 is a schematic illustration 700 of information flow between the video conference software and an add-on application. As discussed elsewhere herein, the video conference 110 includes a talk by the presenter 120 explaining the presentation 130 opened in a virtual channel on the background 140. In addition to the common participant 150, several other participants have installed and activated add-on applications; in particular, a participant 710 has installed and activated the add-on application 180. Each participant is characterized by an associated dataset 720, which may include personal data 720a, location data 720b, temporal data 720c, list of installed add-on applications 720d, privacy and security settings 720e, etc. The participant data 720 is retrieved by video conference software 730, as shown by an arrow 740.

An add-on application 750 has a set of features 760, explained elsewhere herein (see, for example, FIGS. 3-5 and the accompanying texts) utilized by the user 710 and other members of a murmuration associated with the add-on application 750. The add-on application 750 receives necessary information 770 about the members of a corresponding murmuration upon request from the video conference software 730. Reciprocally, the add-on application 750 may generate and extract information 780 related to the activities of murmuration members and to components and functions of the application 750, including visual—textual, symbolic, graphical, etc. —and audio indications (or notifications) 780a, 780b. The add-on application 750 may transfer the extracted information to the video conference software 730, which may display such visual and audio-video indications and information to all video conference participants, irrespective of whether they have any add-on application installed, as illustrated by an item 780' and an arrow 790. For example, the video conference software 730 may display to all participants of the video conference a feedback stats panel, explained in connection with FIG. 5.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: iOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of enhancing a video conference that is provided by video conference software, comprising:
   a subset of participants of the video conference using a particular add-on application that is compatible with the video conference software;
   the add-on application obtaining communication parameters from the video conference software;
   discovering the subset of the participants; and
   the add-on application using the communication parameters from the video conference software to provide at least some of the subset of the participants with private communication that is independent of communication capabilities provided by the video conference software and to provide at least one visual indication to each of the subset of participants, wherein the private communication uses a private view pane and a chat pane for at least some of the subset of participants and wherein either the at least some of the subset of the participants initiate an ad hoc breakout session separate from the video conference or the private communication includes at least one of: one-on-one video chatting, shared writing pads, shared whiteboards, gesture recognition, exaggerated gestures, and non-verbal communication features that provide feedback.

2. A method, according to claim 1, wherein the add-on application provides specific data to the video conference software.

3. A method, according to claim 2, wherein the video conference software provides the specific data to particular participants of the video conference independently of whether any of the particular participants have the add-on application.

4. A method, according to claim 1, wherein at least one visual indication is provided to each of the subset of participants indicating membership in a group corresponding to the subset of participants.

5. A method, according to claim 1, wherein each of the private view pane and the chat pane are one of: an overlay on top of a main video conferencing grid or is provided in a separate pop-up window.

6. A method, according to claim 1, wherein the private communication includes the at least some of the subset of the participants exchanging at least one of: text, audio, and video.

7. A method, according to claim 1, wherein the at least some of the subset of the participants are provided with a recording feature that is separate from any recording feature of the video conference software.

8. A method, according to claim 1, wherein at least one of the participants of the subset of the participants provides a setting to prevent interruption or discovery from other ones of the participants.

9. A method, according to claim 1, wherein at least one of the subset of the participants has at least one other additional add-on application.

10. A method of enhancing a video conference that is provided by video conference software, comprising:
    a subset of participants of the video conference using a particular add-on application that is compatible with the video conference software;
    the add-on application obtaining communication parameters from the video conference software;
    discovering the subset of the participants; and
    the add-on application using the communication parameters from the video conference software to provide at least some of the subset of the participants with private communication that is independent of communication capabilities provided by the video conference software and to provide at least one visual indication to each of the subset of participants, wherein the private communication uses a private view pane and a chat pane for at least some of the subset of participants and wherein one of the subset of participants of the video conference is a separate presenter that is different from a presenter of the video conference and is provided to the at least some of the subset of the participants using the private view pane and the chat pane.

11. A method of enhancing a video conference that is provided by video conference software, comprising:
    a subset of participants of the video conference using a particular add-on application that is compatible with the video conference software;
    the add-on application obtaining communication parameters from the video conference software;
    discovering the subset of the participants; and
    the add-on application using the communication parameters from the video conference software to provide at least some of the subset of the participants with private communication that is independent of communication capabilities provided by the video conference software and to provide at least one visual indication to each of the subset of participants, wherein the at least some of the subset of the participants are provided with additional feedback features that are available only to the subset of the participants and wherein either the additional feedback features include at least one of: voting for a certain aspect of a video conference, addressing a request by a host and addressing a request by one or more of the subset of the participants or the feedback information is displayed to all of the participants of the video conference.

12. A method of enhancing a video conference that is provided by video conference software, comprising:
    a subset of participants of the video conference using a particular add-on application that is compatible with the video conference software;

the add-on application obtaining communication parameters from the video conference software;
discovering the subset of the participants; and
the add-on application using the communication parameters from the video conference software to provide at least some of the subset of the participants with private communication that is independent of communication capabilities provided by the video conference software and to provide at least one visual indication to each of the subset of participants, wherein the at least some of the subset of the participants are provided with additional feedback features that are available only to the subset of the participants and wherein either the additional feedback features include using exaggerated gestures and emoticons or the additional feedback features include simultaneously displaying a stats panel that provides feedback information.

13. A non-transitory computer readable medium containing software that enhances a video conference that is provided by video conference software where a subset of participants of the video conference use a particular add-on application that is compatible with the video conference software, software for the add-on application comprising:
   executable code that obtains communication parameters from the video conference software; and
   executable code that uses the communication parameters from the video conference software to provide at least some of the subset of the participants with private communication that is independent of communication capabilities provided by the video conference software and to provide at least one visual indication to each of the subset of participants, wherein the private communication uses a private view pane and a chat pane for at least some of the subset of participants and wherein the private communication includes at least one of: one-on-one video chatting, shared writing pads, shared whiteboards, gesture recognition, exaggerated gestures, and non-verbal communication features that provide feedback.

* * * * *